(12) United States Patent
Labroille

(10) Patent No.: US 11,131,810 B2
(45) Date of Patent: Sep. 28, 2021

(54) FIXING PROCESS FOR A SINGLE-MODE OPTICAL FIBER AND A MULTIMODE OPTICAL FIBER, OPTICAL COUPLING EQUIPMENT

(71) Applicant: CAILABS, Rennes (FR)

(72) Inventor: Guillaume Labroille, Rennes (FR)

(73) Assignee: CAILabs, Rennes (FR)

( * ) Notice: Subject to any disclaimer, the term of this patent is extended or adjusted under 35 U.S.C. 154(b) by 0 days.

(21) Appl. No.: 17/161,459

(22) Filed: Jan. 28, 2021

(65) Prior Publication Data

US 2021/0157054 A1    May 27, 2021

Related U.S. Application Data

(63) Continuation of application No. PCT/FR2020/051048, filed on Jun. 17, 2020.

(51) Int. Cl.
G02B 6/255       (2006.01)
G02B 6/26        (2006.01)

(52) U.S. Cl.
CPC ......... *G02B 6/2552* (2013.01); *G02B 6/2555* (2013.01); *G02B 6/262* (2013.01)

(58) Field of Classification Search
CPC ... G02B 6/2552; G02B 6/2555; G02B 6/3803
See application file for complete search history.

(56) References Cited

U.S. PATENT DOCUMENTS

| | | | |
|---|---|---|---|
| 5,337,380 A | 8/1994 | Darbon et al. | |
| 6,130,972 A | 10/2000 | Shiraishi et al. | |
| 6,185,346 B1 | 2/2001 | Asawa et al. | |
| 6,487,338 B2 | 11/2002 | Aswawa et al. | |
| 7,155,096 B2 | 12/2006 | Chanclou et al. | |
| 7,184,623 B2 | 2/2007 | Cai et al. | |
| 7,706,644 B2 | 4/2010 | Webster et al. | |
| 9,250,454 B2 | 2/2016 | Morizur et al. | |
| 2003/0053775 A1 | 3/2003 | Chen et al. | |
| 2005/0265653 A1 | 12/2005 | Cai et al. | |

(Continued)

FOREIGN PATENT DOCUMENTS

| | | |
|---|---|---|
| EP | 3274746 A1 | 1/2018 |
| JP | 59-177503 A | 10/1984 |
| WO | 2016/178595 A1 | 11/2016 |

OTHER PUBLICATIONS

Cailabs, "Aroona La Gamme Aroona, Transformez vos fibres multimodes en fibres monomodes," (2019), 8 Pages.

(Continued)

*Primary Examiner* — Omar R Rojas
(74) *Attorney, Agent, or Firm* — TraskBritt

(57) ABSTRACT

A method for fixing a single-mode fiber to a multimode fiber comprises the following steps: injecting light radiation into the injection end of the single-mode fiber and positioning the junction ends of the single-mode fiber and of the multimode fiber relative to one another so as to propagate at least part of the light radiation in the multimode fiber; modally decomposing the light radiation collected at the injection end of the multimode fiber and measuring a quantity representative of the optical power present in a first group of secondary modes; and adjusting the relative position of the junction ends and freezing them with respect to one another in a determined relative coupling position. Coupling equipment for carrying out the fixing method is also disclosed.

9 Claims, 3 Drawing Sheets

(56) References Cited

U.S. PATENT DOCUMENTS

2007/0165982 A1 7/2007 Kokkelink et al.
2013/0044986 A1 2/2013 Chen et al.
2015/0139638 A1 5/2015 Ma et al.
2017/0010463 A1 1/2017 Morizur et al.

OTHER PUBLICATIONS

Carpenter et al., "Mode Transfer Matrix of Multimode Fibers," Summer Topicals Meeting Series, (2014), pp. 176-177.
Flamm et al., "Modal characterization of fiber-to-fiber coupling processes," Optics. Letters, vol. 38, No. 12, (May 31, 2013), pp. 2128-2130.
Fontaine et al., "Design of High Order Mode-Multiplexers using Multiplane Light Conversion," European Conference on Optical Communication (ECOC), (2017), 2 pages.
FR Search Report for FR Application No. 1906447, dated Mar. 19, 2020, 03 pages.
FR Written Opinion for FR Application No. 1906447, dated Mar. 19, 2020, 07 pages.
Haas et al., "A Mode-Filtering Scheme for Improvement of the Bandwidth-Distance Product in Multimode Fiber Systems," J. Lightwave Technology, vol. 11, No. 7, (Jul. 1993), pp. 1125-1131.
International Written Opinion for International Application No. PCT/FR2020/051048, dated 2020, 07 pages.
Morizur et al., "Programmable unitary spatial mode manipulation," J. Opt. Soc. Am. A., vol. 27, No. 11, (Nov. 2010), pp. 2524-2531.
International Search Report for International Application No. PCT/FR2020/051048, dated 2020, 07 pages.
Nguyen et al., "Model Decomposition Technique for Multimode Fibers," Applied Optics, vol. 51, No. 4, (Feb. 2012), pp. 450-451.
Ryf et al., "Mode-Division Multiplexing Over 96 km of Few-Mode Fiber Using Coherent 6*6 MIMO Processing," J. Lightwave Technol., vol. 30, No. 4, (Feb. 15, 2012), pp. 521-531.
Trichili et al., Communicating Using Spatial Mode Multiplexing: Potentials, Challenges and Perspectives, IEEE Communications Surveys & Tutorials, (Apr. 2019), 31 pages.

FIXING PROCESS FOR A SINGLE-MODE OPTICAL FIBER AND A MULTIMODE OPTICAL FIBER, OPTICAL COUPLING EQUIPMENT

CROSS-REFERENCE TO RELATED APPLICATIONS

This application is a continuation of International Patent Application PCT/FR2020/051048, filed Jun. 17, 2020, designating the United States of America, which claims the benefit under Article 8 of the Patent Cooperation Treaty to French Patent Application Serial No. 1906447, filed Jun. 17, 2019, the disclosure of each of which application is incorporated herein in its entirety by this reference.

TECHNICAL FIELD

The present disclosure relates to a method of fixing a single-mode optical fiber propagating light radiation that consists of a fundamental mode to a multimode fiber propagating light radiation that comprises a fundamental mode and a plurality of secondary modes. It also relates to equipment for measuring the quality of the optical coupling between the two fibers.

BACKGROUND

In fiber optic-based telecommunications networks, it is sometimes necessary to optically couple a single-mode optical fiber to a multimode optical fiber. This can be particularly useful for connecting a pre-existing local network based on multimode optical fibers (fibers whose core diameter typically varies from 50 to 62.5 um, such as FDDI, OM1, OM2, OM3 or OM4 fibers, for example, or any fiber verifying the G651 standard) to a high-performance connection based on single-mode optical fibers (fibers whose core diameter typically varies from 8 to 10.5 um, such as OS1 or OS2 fibers, for example, or any fiber verifying the G652, G657, or even G653, G654, G655 or G656 standards). However, the transmission speed (i.e., bandwidth or throughput) through a multimode fiber is usually limited by modal dispersion: the different spatial modes supported by the multimode fiber propagate at different mode group speeds, which leads to time spreading of an optical signal and limits the speed with which data can be transmitted. To avoid this, there is generally an effort to limit the number of modes excited in the multimode fiber. This can be obtained by coupling the single-mode optical fiber to the multimode optical fiber according to an approach designated by the expression "offset launch," as described in document U.S. Pat. No. 7,706,644. In an alternative approach, the aim is to optically couple the fundamental mode of the single-mode fiber only to the fundamental mode guided by the multimode fiber. Such an approach, designated by the expression "center launch," is, in particular, described in document U.S. Pat. No. 7,184,623. Whichever optical coupling approach is chosen, it requires a precise transverse and angular alignment of the optical axes of the two fibers and, in the case of center launch, a good match of the field diameters of the fundamental modes of each fiber.

In general, and independently of the nature of the fibers, there are several known means for fixing the ends of a pair of optical fibers with respect to one another so as to optically couple them.

They can thus be joined by fusing. In this approach, the ends of each fiber are brought together and are heated so as to melt the two surfaces arranged facing one another. They are then placed in contact with one another so as to unify them. In some cases, provision can also be made to taper at least one of the two fibers, at or near their junction ends, so as to adjust the mode field diameters at their junction.

The fusion approach allows a permanent and stable bond to be formed with generally acceptable loss of coupling.

Coupling devices are also known that match up the two junction ends of the fibers so that the radiation emitted by one of them is injected, by propagation in the free space between them, into the other fiber. At least one optical part is generally provided, for example, lenses arranged in the free space, to conform the radiation that propagates between the two fibers to their mode field diameters, so as to improve the optical coupling.

In this case also, the various elements of the coupling device must be fixed relative to one another, for example, on a substrate, so as to form a permanent, stable and robust connection.

Certain equipment items making it possible to fix the junction ends of a pair of fibers with respect to one another provide means for measuring the quality of the optical coupling produced. These means generally comprise a light source connected to an injection end of one of the two fibers and a photodetector connected to the free end of the other fiber.

It is then possible to adjust the relative positioning of the junction ends of the two fibers and of any optical parts so as to maximize the optical power collected at the photodetector. To this end, clamps are available that hold each of the two fibers and any optical parts, the clamps making it possible to micrometrically adjust the position and orientation of these elements before definitively fixing them to one another. However, such an adjustment remains long and complex because of the numerous parameters that must be simultaneously controlled in order to maximize the transmitted power. And more fundamentally, in the case of a coupling by center launch, simply measuring the optical power transmitted by the multimode fiber does not make it possible to determine whether the fundamental mode is indeed the only excited mode of the multimode fiber.

To remedy this, document US2015/139638 proposes to modally decompose the light radiation coming from the free end of one of the two fibers, and to build a "BQV" index of the quality of the coupling from the distribution of the optical power in the different fiber modes. In practice, this document proposes to maximize the optical power that is present in the fundamental mode. This approach does not simply make it possible to adjust or verify the precise transverse and angular alignment of the optical axes of the two fibers and, independently, to adjust or verify a good match of the field diameters of the fundamental modes of each fiber. The coupling of the two fibers, therefore, remains complex because of the numerous parameters that must be simultaneously controlled in order to maximize the transmitted power.

Purpose of the Invention

The present disclosure addresses the aforementioned drawbacks at least in part. More specifically, the disclosure provides equipment for optical coupling of two fibers, preferably by center launch. The equipment can isolate the contribution of certain parameters (e.g., misalignment of the two fibers) from other parameters (e.g., correspondence of mode field diameters). By using the remarkable properties of the equipment, it is possible to set up a simplified and faster method of fixing the fibers ensuring a good quality optical coupling. In the case of coupling by center launch, the optical power injected outside the fundamental mode of the multimode fiber is limited.

BRIEF SUMMARY

With a view to achieving this aim, the object of the present disclosure is to propose a method of fixing a single-mode fiber propagating light radiation that consists of a fundamental mode to a multimode fiber propagating light radiation that comprises a fundamental mode and a plurality of secondary modes, the single-mode fiber and the multimode fiber each having an injection end and a junction end. The method comprises the following steps:
injecting light radiation into the injection end of the single-mode fiber;
positioning the junction ends of the single-mode fiber and of the multimode fiber relative to one another so as to propagate at least part of the light radiation in the multimode fiber;
modally decomposing the light radiation collected at the injection end of the multimode fiber and measuring a quantity representative of the optical power present in a first group of secondary modes comprising at least one of the first two secondary modes from the list of secondary modes classified in decreasing order of effective index;
while continuing the previous measurement step, adjusting the relative position of the junction ends of the single-mode fiber and of the multimode fiber to optimize the quantity representative of the optical power measured in the first group of secondary modes and to determine a relative coupling position; and
freezing, during a fixing step, the junction ends of the single-mode fiber and the multimode fiber with respect to one another in the determined relative coupling position.

According to other advantageous and non-limiting features of the present disclosure, taken alone or in any technically feasible combination:
the first group of secondary modes consists of at least one mode chosen from among the first two modes of the list of secondary modes classified in decreasing order of effective index;
the fixing method includes a coupling step in order to adjust the size of the fundamental mode of the radiation at the junction end of the single-mode fiber and/or the size of the fundamental mode of the radiation at the junction end of the multimode fiber so that they match one another;
the coupling step includes the following steps:
measuring at least one quantity representative of the optical power present in a second group of secondary modes distinct from the first group of secondary modes and comprising at least one of the third, fourth and fifth secondary modes from the list of secondary modes classified in decreasing order of effective index; and
while continuing the previous measurement step, adjusting the size of the fundamental mode of the radiation at the junction end of the single-mode fiber and/or the size of the fundamental mode of the radiation at the junction end of the multimode fiber so as to optimize the quantity representative of the optical power present in the second group of secondary modes.

The fixing method comprises a verification step subsequent to the fixing step, the verification step comprising measuring a quantity representative of the optical power present in a second group of secondary modes, which is distinct from the first group of secondary modes, and comprising at least one of the third, fourth and fifth secondary modes from the list of secondary modes classified in decreasing order of effective index;
the second group of secondary modes comprises at least one of the third, fourth and fifth secondary modes from the list of secondary modes classified in decreasing order of effective index;
the quantity representative of the optical power present in the first group of secondary modes and, where appropriate in the second group of secondary modes, corresponds to the ratio of the optical power of the secondary mode group and of the optical power of the fundamental mode;
a plurality of optical parts are arranged between the junction ends of the single-mode optical fiber and the multimode optical fiber, and the coupling step comprises moving at least some of the optical parts;
the fixing step includes soldering the junction ends of the single-mode fiber and the multimode fiber and the coupling step includes tapering the multimode fiber to match the size of the fundamental mode guided by the single-mode fiber and the size of the fundamental mode guided by multimode fiber.

The fixing method comprises optical coupling of the injection end of the multimode fiber to optical power measuring equipment via a multimode measuring fiber or by free-space propagation;
the method comprises a preliminary step of fixing an intermediate fiber having the desired characteristics of the multimode fiber to a measuring fiber of optical power measuring equipment and removing a segment of the intermediate fiber subsequent to the fixing step; and
the light radiation comes from a source having a coherence length, and the multimode fiber has a length greater than or equal to $5.10^4$ times the coherence length of the source, and preferably $10^5$ the coherence length of the source.

According to another aspect, the object of the present disclosure is to propose equipment for optical coupling of a single-mode fiber and a multimode fiber propagating a fundamental mode and a plurality of secondary modes, the fibers each having a junction end. The equipment includes:
a modal decomposition device for decomposing, according to the fundamental mode and according to a first group of secondary modes comprising at least one of the first two secondary modes from the list of secondary modes classified in decreasing order of effective index, a light radiation having passed through the optical coupling and for supplying at least one quantity that is representative of the optical power present in the first group of secondary modes; and
a device for adjusting the relative position of the junction ends of the single-mode fiber and of the multimode fiber.

According to other advantageous and non-limiting features of the present disclosure, taken alone or in any technically feasible combination:
the optical coupling equipment comprises a multimode measuring optical fiber for collecting the light radiation having passed through the optical coupling and injecting it into the modal decomposition device;

the first group of secondary modes consists of at least one mode chosen from among the first two modes of the list of secondary modes classified in decreasing order of effective index;

the modal decomposition device is configured to supply a quantity representative of the optical power present in a second group of secondary modes of the light radiation having passed through the optical coupling, the second group of secondary modes being distinct from the first group of secondary modes and comprising at least one of the third, fourth and fifth secondary modes from the list of secondary modes classified in decreasing order of effective index;

the second group of secondary modes consists of at least one mode chosen from the third, fourth and fifth secondary modes from the list of secondary modes classified in decreasing order of effective index;

the optical coupling equipment further comprises means for soldering the junction ends of the single-mode fiber and the multimode fiber or means for tapering the junction end of the single-mode fiber and/or the multimode fiber;

the modal decomposition device comprises a multi-plane light conversion device; and the optical coupling equipment comprises a light source whose coherence length is between 5 microns and 1 cm, the multimode measuring fiber having a length greater than or equal to $5.10^4$ times the coherence length of the source, and advantageously greater than or equal to $10^5$ times the coherence length of this source.

BRIEF DESCRIPTION OF THE DRAWINGS

Other features and advantages of the present disclosure will become apparent from the following detailed description of embodiments of the disclosure, which is provided with reference to the appended figures, in which.

DETAILED DESCRIPTION

For the sake of clarity, in the present application, light radiation is defined as radiation formed from at least one transverse spatial mode. Accordingly, the modification or transformation of the phase of the light radiation refers to the modification or transformation of each of the modes of the radiation.

The term "size" of a mode will denote the dimension of the distribution of its intensity in the transverse plane as precisely defined by the MFD ("Mode Field Diameter").

It is recalled that each guided mode of an optical fiber can be characterized by its effective index. The fundamental mode has the largest effective index and the higher-order guided modes have smaller effective indexes that decrease with the order level. In other words, the higher-order guided modes have a lower effective index. In this way, the guided modes of an optical fiber can be ordered, the fundamental mode then forming the first mode of the fiber.

Preparatory Experiment

Figure 1:
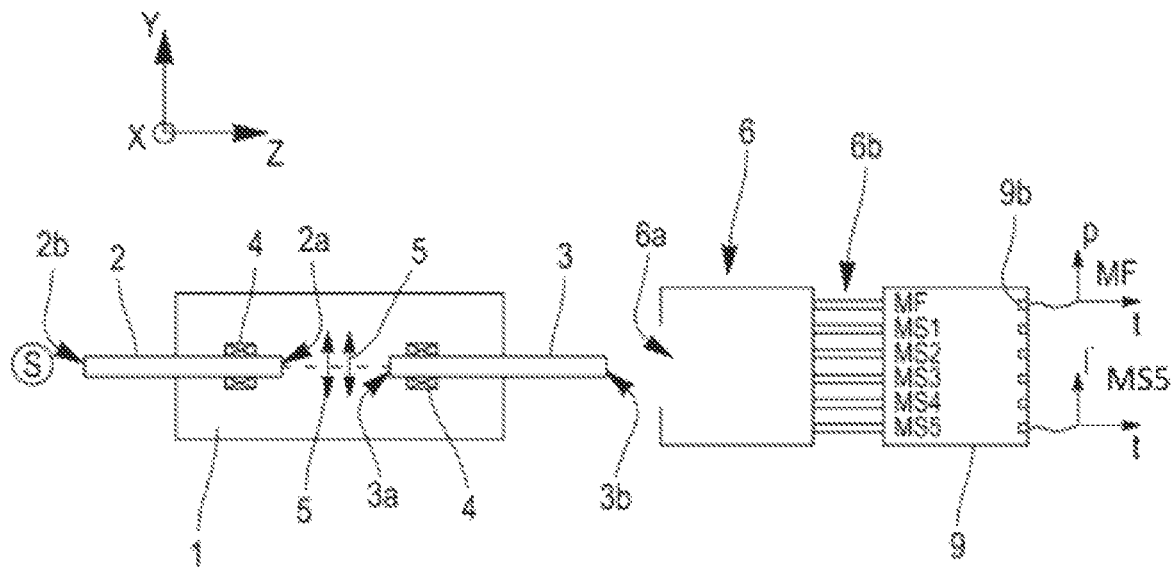
FIG. 1 shows a block diagram of a preliminary experiment.

FIG. 1 shows a block diagram of a preparatory experiment to the present disclosure.

A single-mode fiber 2 and a multimode fiber 3 were arranged on a conventional fixing bench 1. These fibers 2, 3 are held on the bench 1 using adjustment devices 4, such as micrometric clamps making it possible to adjust the relative transverse and angular positioning of the two fibers, or more precisely of the optical axes of these two fibers.

The single-mode optical fiber 2 propagates radiation formed of a single fundamental mode, and the multimode optical fiber 3 propagates radiation formed of a fundamental mode and a plurality of secondary modes. The fundamental modes of the single-mode fiber 2 and of the multimode fiber 3 are similar, that is to say that they have the same general shape, for example, Gaussian, but they can be distinguished by their respective sizes. As is well known per se, this size is defined by the index profile of the fiber in which the fundamental mode propagates.

In the assembly shown in FIG. 1, the optical fibers 2, 3 are arranged in the assembly position. In this position, a junction end 2a of the single-mode fiber 2 is opposite a junction end 3a of the multimode fiber 3. Between the two junction ends 2a, 3a, optical parts 5, here two lenses, have been arranged, the axial position of which can be displaced, that is to say the position in the direction z on the mark shown, which generally extends along the optical axis of the two fibers. The lenses 5, in particular, make it possible to modify the size of a radiation coming from the single-mode fiber 2 with a view to adjusting it to the size of the fundamental mode guided by the multimode fiber 3.

A light source S, for example, a laser source, is optically connected to an injection end 2b of the single-mode fiber 2. The radiation emitted by the source S couples at least in part to the single-mode fiber 2, which propagates it to its junction end 2a. Part of the guided radiation is injected through the lenses 5 and through the junction end 3a of the multimode fiber 3. This injected radiation propagates, guided by the multimode fiber 3, to reappear on the side of its injection end 3b.

The positioning of the two fibers 2, 3 and the lenses 5 is initially coarse and imperfect, so that only a first part of the light radiation that comes from the junction end 2a of the single-mode fiber is injected into the fundamental mode of the multimode fiber 3. A second part of this radiation is injected into the secondary modes of this multimode fiber 3, and another part is not injected into the multimode fiber 3 and is then dispersed in its close environment.

In the experimental setup of FIG. 1, there is also shown a modal decomposition device 6 of the radiation emitted by the injection end 3b of the multimodal fiber 3. Such a device can be produced in multiple ways, and it can, in particular, correspond to that described in the document by Duc Minh Nguyen, Stephane Blin, Thanh Nam Nguyen, Sy Dat Le, Laurent Provino, et al., "Modal decomposition technique for multimode fibers," Applied optics, Optical Society of America, 2012, 51 (4), pp. 450-456, or in the document by Carpenter, B. J. Eggleton and J. Schröder, "Mode Transfer Matrix of Multimode Fibers," 2014 *IEEE Photonics Society Summer Topical Meeting Series*, Montreal, QC, 2014, pp. 176-177.

Regardless of how it has been implemented, the modal decomposition device 6 is configured to decompose the incident radiation precisely according to the guided modes of the multimode fiber 3, that is to say to decompose the incident radiation according to the fundamental mode MF and according to at least part of the secondary modes MS1-MS5 of this multimode fiber 3 so as to determine the optical power that is present in each of these modes. The modal decomposition device 6 is associated with a device 9 for measuring optical power via an interface 6b, and in the illustrated example the measuring device 9 carries its measurements onto output ports 9b. Each of these ports 9b is associated with display means making it possible to show the evolution over time of the optical power present in a particular MF, MS1-MS5 mode. In the example shown in FIG. 1, the measuring device 9 has six output ports 9b to show the evolution over time of the optical power present in the fundamental mode MF and in the first five secondary modes MS1-MS5 of multimode optical fiber 3.

By manipulating the holding devices 4 of one and/or the other fiber 2, 3, and by moving at least one of the lenses 5, the applicant has succeeded in configuring the optical arrangement formed by the fibers 2, 3 and lens 5 so as to obtain a maximum MF measurement on the output port 9b corresponding to the fundamental mode of the multimodal fiber 3. In this optimal configuration, a maximum optical power of the radiation exiting from the single-mode fiber 2 is injected into the fundamental mode of the multimode fiber 3.

In a first test sequence, and starting from this optimal configuration, the adjustment devices 4 are manipulated to micrometrically move the fibers 2, 3 transversely and/or angularly with respect to each other, while keeping the lenses 5 motionless. In this way, only the alignment of the optical axes of the two fibers 2, 3 is modified. The optical powers P recorded on the output ports 9b are shown on the graphs of FIG. 2a, in which the power (on the y-axis) in the first two secondary modes MS1, MS2 according to the misalignment of the two axes (on the x-axis) has been grouped together in a first group of secondary modes.

In a second test sequence, and after having returned the arrangement to its optimal configuration, the position of one of the lenses 5 is micrometrically varied in the direction z on either side of its optimal position. The optical fibers 2, 3 are kept stationary. In this way, only the size of the radiation injected into multimode fiber 3 is modified. The optical powers P recorded on the output ports 9b are shown on the graphs of FIG. 2b, in which the power (on the y-axis) in the three secondary modes of order three to five MS3-MS5 according to the mode size difference (on the x-axis) has been grouped together in a second group of secondary modes.

Figure 2A:
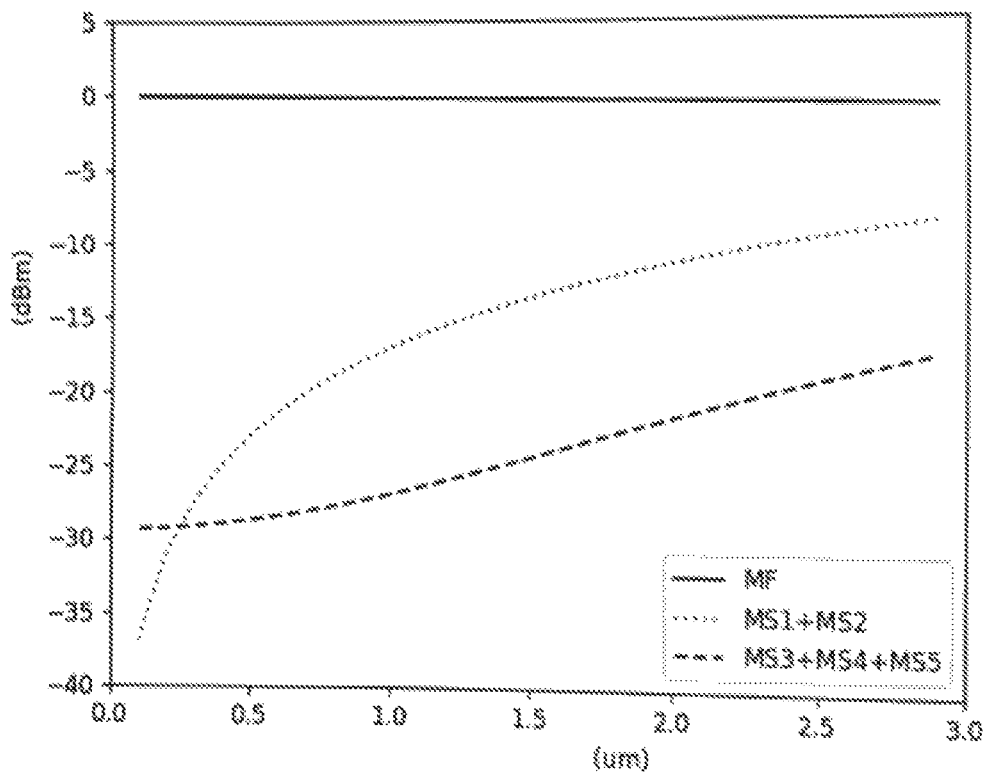
FIGS. 2a and 2b show optical power readings illustrating a series of tests of a preparatory experiment.
Figure 2B:
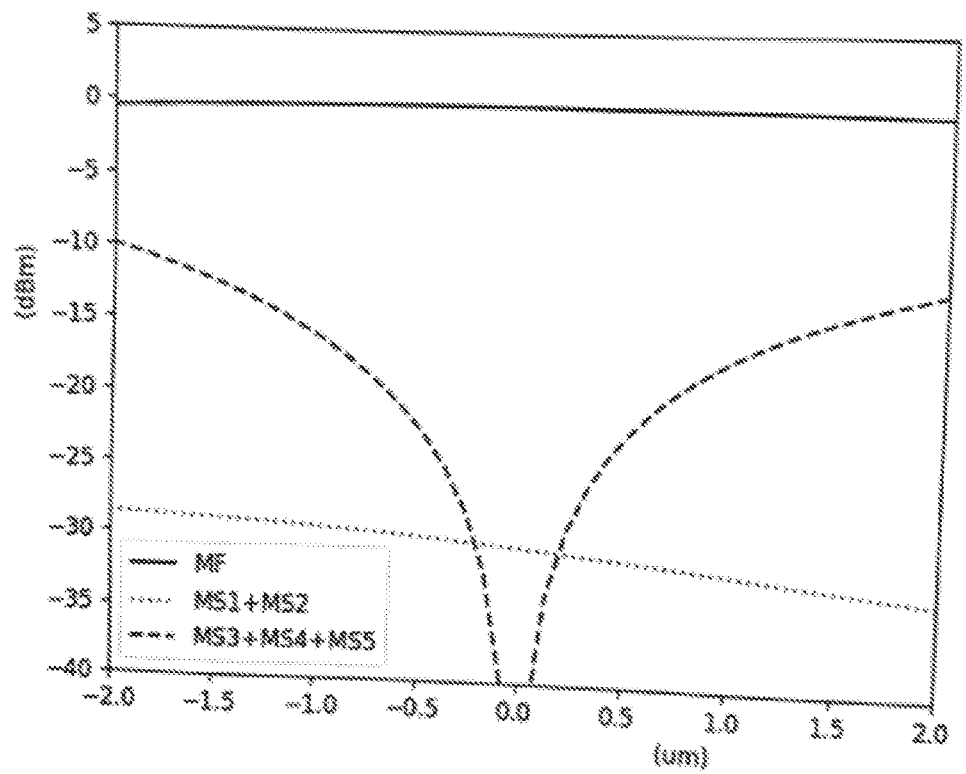

It is very clearly observed on the graphs of FIGS. 2a and 2b that a transverse or angular misalignment of the two fibers 2, 3 leads to the injection of the light radiation coming from the single-mode fiber 2 in its fundamental mode and mainly in the first group of secondary modes formed by the first two secondary modes MS1, MS2. More precisely, it is observed that the power in the fundamental mode varies very slightly when the two fibers are moved laterally from the optimal position, while the slightest misalignment is directly observable on the first two secondary modes MS1-MS2, and in a more attenuated manner on the next three MS3-MS5. Similarly, the variation in the size of the radiation projected into the junction end 3a of the multimode fiber 3 leads to injecting the light radiation in its fundamental mode and mainly in a second group of secondary modes MS3-MS5, different from the first group of modes, formed from the three secondary modes of order three to five. The power in the fundamental mode varies very slightly when the sizes of the modes deviate from one another, while the smallest size deviation is directly observable on the three secondary modes of order three to five MS3-MS5.

Thus, by observing the optical power selectively transmitted in secondary modes of the multimode fiber 3, it is possible to separately measure the coupling faults, in an optical coupling with two fibers, due to alignment deviations (a measurement of which is given by the optical power measured in the first group of secondary modes) of the mode size correspondence deviations (a measurement of which is given by the optical power measured in the second group of secondary modes).

Coupling Equipment

The present disclosure takes advantage of the observations made during these preliminary experiments to propose coupling equipment E for a single-mode fiber 2 and a multimode fiber 3.

Figure 3:
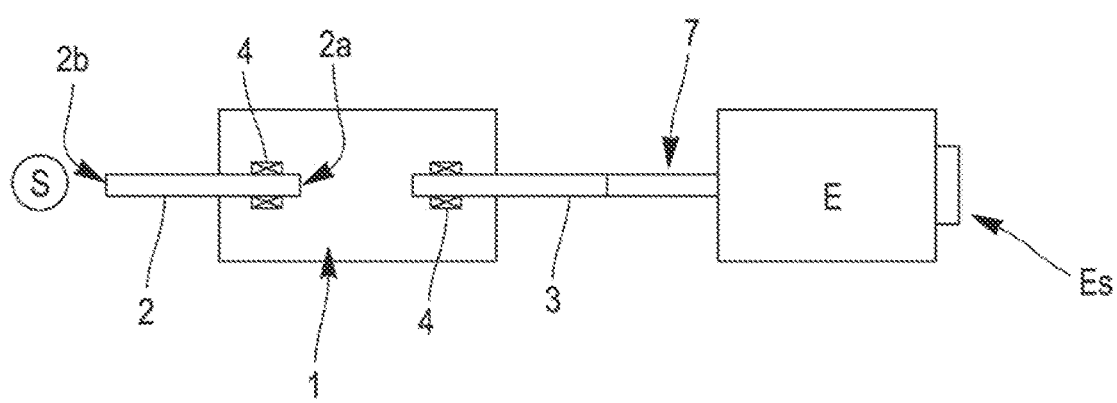
FIG. 3 shows an embodiment of equipment for optical coupling of two optical fibers.

One embodiment of such equipment is shown in FIG. 3. As was presented in the previous part of this description, the equipment E comprises a device 4 for adjusting the relative position of the junction ends of the single-mode fiber 2 and of the multimode fiber 3. It can also include means for soldering and/or tapering the two fibers together. The tapering means, when they are present, form a device for adjusting the size of the modes. The adjustment device 4 and the soldering and/or tapering means are well known per se, and for the sake of brevity will not be further detailed.

The equipment E can comprise or be associated with a light source S that is arranged to inject light radiation on the side of the injection end 2b of the single-mode fiber 2. The light source can be a laser source, a superluminescent diode, an ASE source (for "Amplified Spontaneous Emission"). Depending on the nature of the modal decomposition device 6 of the equipment E that will be implemented, the light source S may be a laser source S with a long coherence length (of more than 1 cm), possibly tunable, or on the contrary a source S with a short coherence length (less than 1 cm). The source S may have its central wavelength in the O band (for example, at 1310 nm) or in the C band (for example, at 1550 nm), two spectral bands that are widely used in the field of telecommunications. Preferably, and, in particular, when the modal decomposition device 6 is implemented by an MPLC device (detailed in the remainder of this description) and to avoid any interferometric beat, the source S will have a reduced coherence length, less than 1 cm.

In the context of the present description, we define the coherence length $L = 2.\ln(2).\lambda^2/(Pi.\Delta\lambda)$ where $\lambda$ is the central wavelength of the source and $\Delta\lambda$ is the width halfway up the source spectrum.

For reasons of availability and cost, it is preferable to choose the source so that its coherence length is between 5 microns and 1 cm.

The equipment E comprises a modal decomposition device 6 for modal decomposition of an incident radiation corresponding to the light radiation having passed through the optical coupling formed between the two fibers. The modal decomposition device 6 is configured to decompose the incident radiation precisely according to the guided modes of the multimode fiber 3, that is to say to decompose the incident radiation according to the fundamental mode and according to at least part of the secondary modes of this multimode fiber 3. The measuring equipment E uses the modal decomposition device 6 to supply, on one of its output ports Es, a quantity representative of the optical power measured in this part of the secondary modes. It may, for example, be a matter of measuring the optical power present in the fundamental mode and in these secondary modes, in order to establish the ratio of optical power available in these secondary modes to the optical power available in the main mode.

The modal decomposition device 6 can take any suitable form. It may, in particular, be a device conforming to one of those presented in the aforementioned articles.

It can thus comprise, for example, a detector taking the form of a camera, so as to collect the radiation having passed through the optical coupling, and calculation means for identifying, in the captured images, the optical power present in the fundamental mode and in the secondary modes of the multimode fiber.

It can also be a spatial mode demultiplexer, aiming to isolate, in the radiation that has passed through the optical coupling and the multimode optical fiber 3, the fundamental mode and the secondary modes. A description of such demultiplexers can be found in the document by Trichili, A., Park, K. H., Zghal, M., Ooi, B. S., & Alouini, M. S. (2019), "Communicating using spatial mode multiplexing: Potentials, challenges and perspectives." *IEEE Communications Surveys & Tutorials*. This demultiplexer could be associated with detectors to establish, on the output ports Es, the optical power measurements on each of the isolated modes.

In a preferred mode of implementation, the modal decomposition device 6 implements means capable of spatially isolating the fundamental mode and the secondary modes of the multimode fiber 3. These means are able to modify the shape of the incident light radiation. This modification can be precisely described in a modal form, that is to say by defining how modes of a family of modes of a transverse input plane are transformed into output modes of a family of output modes of a transverse output plane. Here, the input mode family consists of the fundamental mode and the secondary modes of the multimode fiber 3 after they have propagated to the input plane. The output mode family consists of the spatially isolated modes in the output plane, at detectors or at collection fibers.

Such a transformation described in modal form can be implemented by different types of devices. It may thus be a device using phase plates and separator plates as described in the document by Ryf, Roland, et al., "Mode-Division Multiplexing Over 96 km of Few-Mode Fiber Using Coherent 6*6 MIMO Processing" *Journal of Lightwave technology* 30.4 (2012): 521-531.

A modal decomposition can also be implemented by a multiplane light conversion device, more commonly referred to as "Multi-Plane Light Converter" (HPLC), and this approach forms the preferred embodiment of the modal decomposition device 6.

For the sake of completeness, it is recalled that in such an MPLC device, incident light radiation undergoes a succession of reflections and/or transmissions, each reflection and/or transmission being followed by free-space propagation of the radiation. At least some of the optical parts on which the reflections and/or the transmissions take place, and that guide the propagation of the incident radiation, have a microstructured surface that modifies the incident light radiation and, in particular, its phase.

The term "microstructured surface" means that the surface of the optical part has a relief, which can, for example, be broken down in the form of "pixels" whose dimensions are between a few microns to a few hundred microns. The relief or each pixel of this relief has a variable elevation with respect to a mean plane defining the surface in question, of at most a few microns or at most a few hundreds of microns. An optical part having such a microstructured surface forms a phase mask introducing a local phase shift within the transverse section of the radiation, which is reflected therein or which is transmitted therein.

Thus, a light radiation that propagates within an MPLC device undergoes a succession of local phase shifts separated by propagations. The succession of these elementary transformations (for example, at least four successive transformations such as 8, 10, 12, 14, or even at least 20 transformations, for example) establishes an overall transformation of the spatial profile of the incident radiation. It is thus possible to configure the microstructured reflection or transmission surfaces to transform a first light radiation, which, in particular, has a specific shape, into a second radiation whose shape is different.

The documents "*Programmable unitary spatial mode manipulation,*" Morizur et Al, *J. Opt. Soc. Am. A/Vol. 27, No. 11/November* 2010; N. Fontaine et Al, (ECOC, 2017), "Design of High Order Mode-Multiplexers using Multiplane Light Conversion"; U.S. Pat. No. 9,250,454 and US2017010463 contain the theoretical foundations and examples of practical implementation of an MPLC device.

The modal decomposition implemented in hardware by such an MPLC device is much more efficient to implement than a software approach by image processing.

In one preferred embodiment of the optical coupling equipment E, the modal decomposition device 6 therefore comprises at least one microstructured optical part that has been digitally configured to spatially separate the incident light radiation in an exit plane of the modal decomposition device 6 according to the fundamental mode and secondary modes of the multimode fiber 3. Thus, in the example of FIG. 4, the modal decomposition device 6 comprises two reflective optical parts 8a, 8b arranged facing one another, phase masks 8c being borne by one of the two reflective optical parts 8a so as to microstructure it, the second reflective optical part 8b being formed by a simple mirror. In this way, a multi-passage cavity is formed, which makes it possible to carry out the desired modal decomposition during a plurality of reflections, and the fundamental mode and the secondary modes are projected onto the detectors (for example, of the output stage 6d).

Thus, and in certain embodiments, the modal decomposition device 6 can comprise an output stage 6d, arranged in a transverse output plane in which the modal components of the incident radiation are spatially separated. The optical power present in each of the spatially isolated modes in this plane is measured or at least evaluated, for example, by a detector, such as a photodetector, precisely arranged in the output plane so as to collect the radiation isolated from the mode with which it is associated. The output stage 6d can, therefore, consist of a strip of photodetectors. The measurements provided by the photodetectors are transferred to the output channels Es of the equipment E. Each of these ports can be associated with display means making it possible to show the evolution over time of the optical power present in a particular mode or in a particular group of modes.

Alternatively, the output stage 6d can comprise a plurality of collection fibers, which can form a bundle of fibers, precisely spatially arranged in the output plane so as to couple with the output radiation corresponding to the fundamental and secondary modes that have been separated and transformed by the modal decomposition device 6. These fibers then make it possible to guide the radiation toward remote photodetectors, for example, in a measuring section of the equipment E. The measuring section prepares the measurements and carries them onto the output channels Es of the equipment E.

Whether the measurement is prepared directly at the output plane of the modal decomposition device 6 or remotely in a measuring section, the equipment E is able to develop quantities representative of the optical powers that are respectively present in secondary modes of the incident radiation. Advantageously, the representative quantities are expressed as the ratio of the optical power present in the considered mode and the optical power present in the fundamental mode.

According to a first configuration, the modal decomposition device 6 isolates a first group of secondary modes from the multimode optical fiber, from the fundamental mode and from a second group of secondary modes.

The modes of the first group are then spatially superimposed on one another in the output plane of the output stage. Similarly, the modes of the second group of modes are spatially superimposed on one another in the output plane. In this configuration, a first photodetector or a first collection fiber, in this case multimode, is then provided, arranged at the output stage so as to collect the output radiation that is associated with the modes of the first group. It is also possible to provide a second photodetector or a second collection fiber in order to collect the output radiation associated with the second group of modes. Advantageously, a third photodetector or a third collection fiber will also be provided in order to collect the output radiation associated with the fundamental mode. In all cases, the measurements taken by the detectors are distributed over the output channels Es of the equipment.

Figure 4:
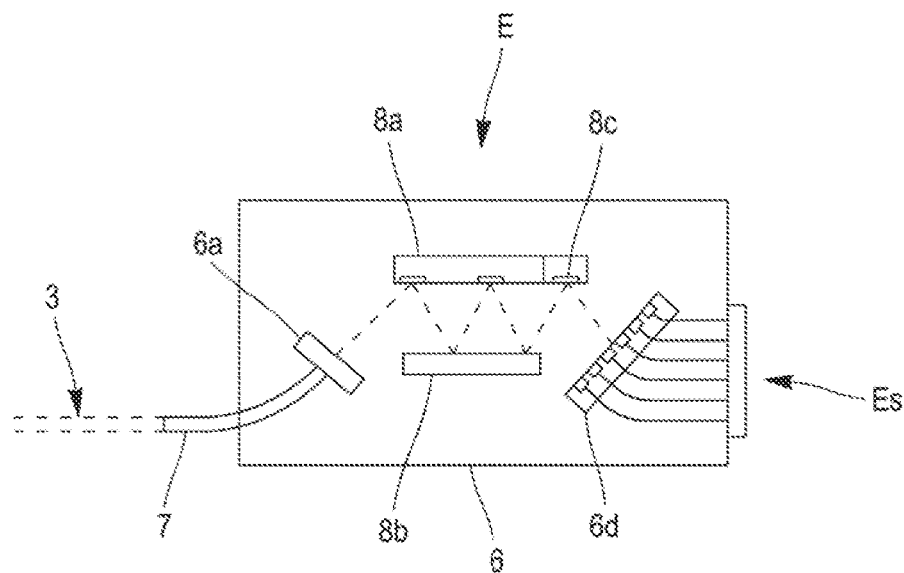
FIG. 4 shows a block diagram of an assembly allowing the implementation of a method according to the disclosure.

According to another configuration that is that shown in FIG. 4, all of the modes making up the first group, the second group and the fundamental mode of the multimode fiber 3 are spatially separated from one another. The equipment E then provides as many detectors or collection fibers in the output stage 6d as there are modes for respectively collecting the output radiation. The output fibers can in this case be single-mode fibers. And in this case too, the performed measurements are carried onto the output channels Es of the equipment E.

In other possible configurations, it would naturally be possible to combine the first and the second configuration, that is to say to spatially isolate only part of the groups of modes of the multimode fiber 3. Provision could also be made to form other groups of modes, for example, by collecting modes of an order greater than 5 of the multimode fiber when these are classified in decreasing order of effective indices, which can be transferred to the output channels Es of the equipment E.

As we have seen, and irrespective of the selected configuration, the first group of secondary modes comprises at least one of the first two secondary modes of the multimode optical fiber 3, when they are classified in decreasing order of effective indices. The second group of secondary modes comprises at least one of the third, fourth and fifth secondary modes from the list of secondary modes classified in decreasing order of effective index. In all cases, the two groups of modes are distinct from one another, and advantageously the first group of modes does not include the third, fourth and fifth secondary modes, which can constitute the second group of modes. Conversely, the second group of modes does not include the first two secondary modes of the multimode optical fiber 3, which can constitute the first group of modes.

Returning to the general description of the coupling equipment E, provision can be made for the modal decomposition device 6 to be fitted with a multimode measuring fiber 7 of the same type as the multimode fiber 3 that it is desired to attach to the single-mode fiber 2. This multimode measuring fiber 7 makes it possible to guide the radiation guided by the tested fibers 2, 3 in order to arrange it precisely at an input stage 6a of the modal decomposition device 6, defining a transverse input plane. Alternatively, provision can be made for the radiation coming from the multimode fiber 3 to be injected precisely, by free propagation, into the modal decomposition device 6, at the transverse input plane. Provision can also be made for this multimode measuring fiber 7 to be provided with a mechanical connector to connect to a connector of the same type arranged at the injection end 3b of the multimode fiber 3, although the disturbance that these connectors could introduce does not make it a preferred solution. When it is present, the multimode measuring fiber 7 is, therefore, preferably soldered to the injection end 3b of the multimode fiber 3. In all cases, the radiation injected by the multimode fiber 3 is introduced into the modal decomposition device 6 and constitutes the incident radiation.

When the modal decomposition device 6 is fiberized, very particular care will be taken in choosing the length of the multimode measuring fiber 7. In fact, whether the multimode fiber 3 is coupled to the measuring fiber by a connector or by soldering, the interface faults at this fixing lead to disturbing the propagation of radiation in the multimode measuring fiber 7. These disturbances are liable, by interferometric beating, to disturb the measurement by inducing a fluctuation in the measured optical power.

This phenomenon is overcome by adjusting the length of the multimode measuring fiber 7 to the coherence length of the light source S of the equipment E; the greater this coherence length is, the longer the measuring fiber must be. In general, the length of the measuring fiber will be chosen so that it is greater than or equal to $5.10^4$ times the coherence length, and advantageously greater than or equal to $10^5$ times the coherence length.

To be complete, it should be specified that the equipment E can also include a calculation and/or display unit in order to prepare and show the measurements on each of its output channels Es and/or to combine them with one another. It should be noted that the computing device can establish any quantity that is representative of the optical power collected in each group of modes. The equipment E can include a screen, indicator lights or any other form of indicator allowing an operator to obtain the optical power distribution information according to the different output channels Es of the equipment E. In an advantageous manner, it will be preferable to carry measurements onto these channels relative to optical power (that is to say the optical power compared to the optical power of the fundamental mode, as explained above), in order to compensate for a possible emission variability of the light source S.

The measurements provided by the equipment E can also be used to control the devices for adjusting the relative position of the junction ends of the single-mode fiber 2 and of the multimode fiber 3 and/or the size of the modes resulting from these fibers, as will be detailed later in this description.

Method of Fixing a Pair of Fibers

The coupling equipment E that has just been described can be used in a method for fixing a single-mode fiber 2 to a multimode fiber 3, in order to simplify their assembly while ensuring good optical coupling quality. It can, in particular, be a coupling by center launch, as was explained in the introduction to this application, in which it is sought to best inject the mode of the single-mode fiber 2 into the fundamental mode of the multimode fiber 3.

This method, therefore, fixes the junction ends 2a, 3a of the single-mode fiber 2 and of the multimode fiber 3 to one another, by soldering or by any other means. For the sake of precision, it is again specified that the multimode fiber 3 propagates a fundamental mode and a plurality of secondary modes.

The setup for deploying this method is similar to that shown in FIG. 1. On a manufacturing bench 1 of the coupling equipment E, an adjustment device 4 makes it possible to position the fibers one opposite the other and to adjust their relative positions in all possible transverse and angular directions. Light radiation coming from the light source S is injected on the side of the injection end 2b of the single-mode fiber 2. The injection end 3b of the multimode fiber 3 is in turn connected to the modal decomposition device 6 of the coupling equipment E. For example, the injection end 3b of the multimode fiber 3 can be soldered to an optical measuring fiber 7 for measuring the modal decomposition device 6. The equipment E is, therefore, able to supply, on one of the output channels Es, a quantity representative of the optical power present in the first group of secondary modes of the radiation guided by the multimode fiber 3.

In a method according to the present disclosure, the junction ends of the fibers 2, 3 are firstly positioned relative to one another so as to propagate at least part of the light radiation coming from the source S in the multimode fiber 3. This radiation is guided by the multimode fiber 3 and injected into the modal decomposition device 6, which, therefore, at least provides a quantity representative of the optical power of the first group of secondary modes.

This measurement is carried out continuously. While continuing it, the relative position of the junction ends 2a, 3a of the fibers 2, 3 is adjusted by operating the holding devices 4. This adjustment is carried out by seeking to minimize the measurement supplied by the equipment E corresponding to the optical power present in the first group of modes. As we have seen, this measurement is representative only of the misalignment of the two fibers 2, 3 and it is very sensitive to it. A measurement means is, therefore, available that makes it possible to align the optical axes of the fibers as well as possible.

Once the optimum relative position has been determined, it can be fixed and the fibers can be fixed during a subsequent fixing step, which may be a step of welding the fibers together or of fixing to a common support (by means of any optical parts, if such parts are provided).

The method can also include a coupling step, which can take place before, during or after the fixing step. During this step, an attempt is made to match the size of the fundamental modes of the single-mode fiber 2 and of the multimode fiber 3 in order to thus limit the optical coupling losses between the fundamental modes of the two fibers.

In the context of the present application, "match" means that the size of the fundamental mode of the multimode fiber (at its junction end) does not differ by more than 20%, and preferably by more than 10%, from the size of the mode of the single-mode fiber.

To achieve this size adjustment, help can be obtained from the measurement of the optical power in the second group of secondary modes, delivered by the device E on at least one of the output channels Es (for example, secondary modes 3 to 5 to resume the preferred embodiment described thus far).

This size adjustment can be effected by adjusting the position of at least one of the optical parts (for example, two lenses) arranged between the two junction ends 2a, 3a. The adjustment is carried out while continuing to take the measurement, so that the position of this optical part can be determined, minimizing the quantity representative of the optical power that is present in the second group of modes. The position of the optical part corresponding to this minimum power ensures the best modal coupling match between the two fibers 2, 3. It is also noted that the provided measurement is representative only of the size difference, and very little of the alignment difference, which facilitates the search for the optimal positioning of the optical part.

When the technique implemented during the coupling step implements a technique of tapering one of the two fibers, it is not easy to take advantage of the continuous measurement of the optical power in the second group of secondary modes. At the very least, the optical power measurement can be used in the second group of secondary modes, during a step a verification step subsequent to the coupling and/or fixing step, in order to ensure that they are done correctly. This measurement can also be used to calibrate, in preparatory steps of the coupling method, the device for adjusting the size of the modes (and generally for welding and tapering) to the characteristics of the single-mode and multimode fibers that are coupled by the equipment E. The verification step can of course also include measuring optical power in the first group of secondary modes in order to fully qualify the quality of the fixing.

It should be noted that the adjustment steps of the method can be carried out by an operator who is visually aware of the readings provided by the equipment E to manipulate the adjustment device 4, the soldering means and/or the tapering means forming a device for adjusting the size of the modes. Alternatively, they can be implemented by automatic fiber assembly equipment, which controls all of these elements to make the necessary adjustments.

In one preferred embodiment of the present disclosure, the modal decomposition device 6 is provided with a multimode measuring fiber 7, the length of which has been chosen to comply with the principles set out in a previous passage of this description (i.e., greater than or equal to $5.10^4$ times the coherence length of the source, and advantageously greater than or equal to $10^5$ times this coherence length). An intermediate fiber of very great length, for example, with a length from 3 meters to several kilometers, and having the desired characteristics of the multimode fiber 3 that it is desired to fix to the single-mode fiber 2, has been fixed to the multimode measuring fiber 7. The length of the intermediate fiber will be chosen, depending on the coherence length of the source S, to meet at least the same length constraints as those relating to the multimode measuring fiber 7 and for the same reasons. The intermediate fiber can be supplied in the form of a spool. The method that has just been explained can be used to fix one end of this intermediate fiber to the multimode measuring fiber 7. During the fixing process according to the disclosure, the second end of the large intermediate fiber is fixed to the single-mode fiber 2. Once the two junction ends 2a, 3a have been fixed to one another, a segment of the intermediate fiber is removed by cutting it to form a multimode fiber 3 of selected length fixed to the single-mode fiber 2. This length may be any length and, in particular, less than the minimum length making it possible to erase the interferometric beat phenomenon. In addition, by successively removing a segment of the intermediate fiber of great length after having fixed it to the single-mode fiber 2, it is avoided to repeatedly fix a multimode fiber 3 that is to be fixed on a single-mode fiber 2, to the multimode measuring fiber 7. It is possible to take the very long intermediate fiber of several tens to several hundred multimode fibers 3 without repeating these operations, which is very appreciable industrially.

Moreover, and as has already been noted, by providing relatively long multimode fiber lengths between the junction ends 2a, 3a to be fixed and the coupling equipment, the latter can be provided with a light source having a reduced coherence length requirement.

When the method seeks to attach a single-mode fiber 2 to a multimode fiber 3 comprising a connector on the side of its injection end, it is then not possible to implement the preferred embodiment described above. In order to ensure the precision of the fixing of the two fibers, the length of the multimode fiber 3 comprising the connector will then necessarily be chosen to comply with the same length constraints as those relating to the multimode measuring fiber 7, according to the coherence length of the source.

In other words, when the length of the multimode fiber 3 comprising the connector is imposed, a source will be chosen having a coherence length such that the ratio of $5.10^4$ (and preferably $10^5$) between this length of fiber and the source coherence length is respected. In this case, it may be necessary to choose a source whose coherence length is much less than 5 microns.

Example Embodiment

In general, the loss of optical power at the fiber coupling interface resulting from the size difference between the fundamental mode of the radiation guided by the single-mode fiber 2 and the fundamental mode of the radiation guided by the multimode fiber 3 is greater than the loss of optical power linked to the misalignment of the optical axes of the fibers. It is, therefore, important to adjust these sizes.

When the aim is to solder the fibers together, in particular, in a center launch configuration, and it is, therefore, not possible to use optical parts, the size adjustment can be done by tapering one of the fibers.

To avoid or simplify this approach, provision can be made to apply the fixing method and use the coupling equipment E that has just been described after having previously soldered a section of single-mode fiber 2' to the junction end 2a of the single-mode fiber 2. This second single-mode fiber 2' has a wide single-mode core, which has been chosen so that its fundamental mode corresponds in size to that of the fundamental mode of the multimode fiber 3. The mode of the wide-core single-mode fiber 2' in turn has a size larger than that of the guided mode of the single-mode fiber 2.

Once this preliminary step has been completed, the free end of the wide-core single-mode fiber 2' can be assembled with the junction end 3a of the multimode fiber 3. The relative position of the fibers 2', 3 is adjusted by using the measurements provided by the coupling equipment E to determine that which minimizes the quantity of optical power of the first group of secondary modes, and this position is fixed, for example, by soldering. If this quantity (in particular, the relative power present in the first group of secondary modes) cannot be reduced below a predetermined threshold value, by adjusting the relative position of the two fibers, it is because at least one of these two fibers does not meet the prescribed specifications, and assembly may be interrupted.

Note that the wide-core single-mode fiber 2' having been chosen to match the size of its mode to that of the fundamental mode of the multimode fiber 3, it is not necessary here to adjust these sizes to one another, in particular, by tapering, in order to ensure a quality optical coupling.

However, it remains advantageous to measure the power or the relative power present in the second group of secondary modes, after the soldering step, during a verification step. It is confirmed that the mode sizes are indeed well adjusted if this measurement is below a predetermined threshold value. If this is not the case, again, it is because at least one of these two fibers does not meet the imposed specifications, and the assembly can be interrupted.

The fixing of the single-mode fibers 2, 2' to one another must of course be controlled, in particular, in the alignment of their optical axes. This fixing step comprises the welding of the two fibers to one another, and possibly the tapering of the wide-core fiber, so as to make the respective size of the modes match, and thus limit the insertion losses of the device. In order to implement this step, help can be obtained from traditional means of soldering and tapering fibers. It should be noted that the tapering step is optional here, since, regarding the coupling of two single-mode fibers, there is of course no risk of exciting a secondary mode.

Figure 5:
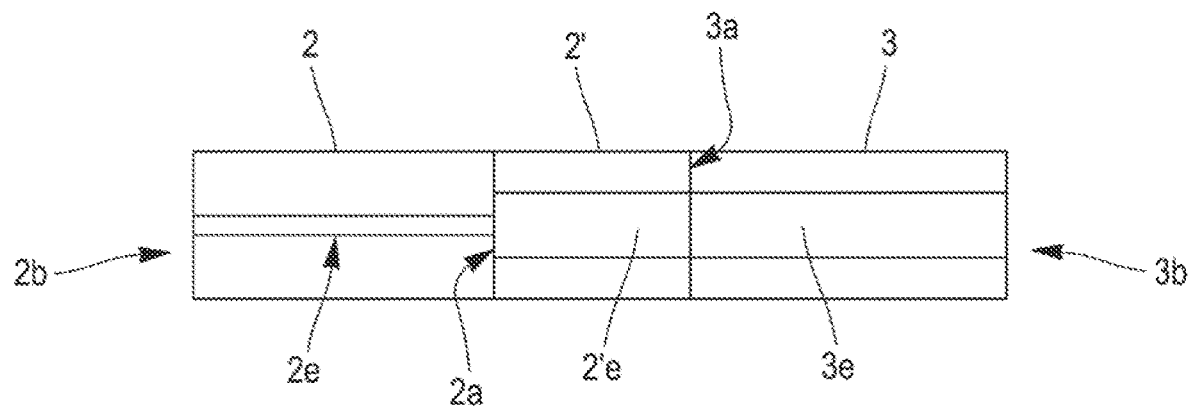
FIG. 5 shows an optical fiber according to another aspect of the disclosure.

At the end of this assembly, there is a composite fiber comprising a first optical fiber 2 having a junction end 2a and a single-mode core 2e that is capable of propagating a fundamental mode having a determined size, a second optical fiber 3 having a junction end 3a and a multimode core 3e that is capable of propagating a fundamental mode having a determined size and a plurality of secondary modes. This fiber also comprises a third optical fiber 2' having a single-mode core 2'e that is capable of propagating a fundamental mode having a determined size and two ends respectively soldered to the junction ends 2a of the first optical fiber 2 and the junction end 3a of the second optical fiber 3 so as to couple them optically. The size of the fundamental mode of the third optical fiber corresponds, at its end soldered to the junction end of the second optical fiber, to the size of the fundamental mode of the second optical fiber. This fiber is shown in FIG. 5.

When a step is provided for tapering one of the single-mode fibers 2, 2' (and preferably the wide-core single-mode fiber 2'), the size of the fundamental mode of the third optical fiber corresponds, at its end soldered to the junction end of the first optical fiber, to the size of the fundamental mode of the first fiber.

When the fiber is intended for applications in the field of telecommunications, the second multimode fiber 3 can have a core 3e whose diameter varies from 50 to 62.5 um, so as to comply with a fiber of the FDDI, OM1, OM2, OM3 or OM4 type or a fiber verifying the G651 standard. The first single-mode fiber 2 can have a core 2e whose diameter varies from 8 to 10.5 um, to conform to a fiber of the OS1 or OS2 type or more generally to a fiber verifying the G652, G657, or even G653, G654, G655 or G656 standards.

It can be noted that the single-mode optical fiber 2 and the multimode optical fiber 3 provide injection ends 2b, 3b for the connection of a pre-existing optical network comprising a single-mode section to be connected to a multimode section, so that the size of their cores and guided modes are not freely chosen. By inserting a relatively short section, of a few hundred microns, for example, and more generally between 100 microns and a few cm, of a wide-core optical fiber 2', the manufacture of the connecting fiber is greatly simplified when the method and equipment E previously proposed in this description are employed. It is possible to have a plurality of composite fibers that are identical or similar to that described and shown in FIG. 5 in a box having inputs/outputs respectively connected to the injection ends 2b, 3b of the composite fibers, so as to form a device for connecting a single-mode optical network to a multimode optical network.

As will be readily understood, the present disclosure is not limited to the described embodiments, and it will be possible to add variants thereto without departing from the scope of the invention as defined by the claims.

Thus, although the first group of modes and the second group of modes have preferably been presented as consisting, respectively, of the first two secondary modes and modes MS3 to MS5 of the list of secondary modes classified in decreasing order of effective index, the present disclosure is in no way limited to such a definition. Provision can thus be made for the first group of modes to contain only one or the other of the first two secondary modes of the multimode fiber. Similarly, provision can also be made for the second group of modes to contain only part of modes MS3 to MS5 of the list of secondary modes of the multimode fiber. It is also possible to provide other groups of modes to help with the coupling of the two fibers.

What is claimed is:

1. A method of fixing a single-mode fiber propagating light radiation consisting of a fundamental mode to a multimode fiber propagating light radiation comprising a fundamental mode and a plurality of secondary modes, the single-mode fiber and the multimode fiber each having an injection end and a junction end, the method comprising the following steps:

soldering a section of a second single-mode fiber to the junction end of the single-mode fiber, the second single-mode fiber having a single-mode core chosen so that its fundamental mode corresponds in size to that of the fundamental mode of the multimode fiber and is greater than that of a guided mode of the single-mode fiber;

optically coupling the injection end of the multimode fiber to a multimode measuring fiber allowing the light radiation guided by the multimode fiber to be placed at an input stage of a multiplane light conversion device;

injecting light radiation into the injection end of the single-mode fiber, the light radiation coming from a source having a coherence length, and the multimode measuring fiber having a length greater than or equal to $5.10^4$ times the coherence length of the source;

positioning a free end of the second single-mode fiber and the junction end of the multimode fiber relative to one another so as to propagate at least part of the light radiation in the multimode fiber;

modally decomposing the light radiation collected at the injection end of the multimode fiber using the multiplane light conversion device, and measuring a quantity representative of optical power present in a first group of secondary modes comprising at least one of the first two secondary modes from the plurality of secondary modes classified in decreasing order of effective index;

while continuing the measuring step, adjusting the relative position of the free end of the second single-mode fiber and of the junction end of the multimode fiber to optimize the quantity representative of the optical power measured in the first group of secondary modes and to determine a relative coupling position; and freezing, during a fixing step, the junction ends of the single-mode fiber and the multimode fiber with respect to one another in the determined relative coupling position.

2. The method of claim 1, further comprising a verification step subsequent to the fixing step, the verification step comprising measuring a quantity representative of the optical power present in a second group of secondary modes that is distinct from the first group of secondary modes and comprising at least one of a third, fourth and fifth secondary mode from the plurality of secondary modes classified in decreasing order of effective index.

3. The method of claim 2, wherein a plurality of optical parts are arranged between the junction ends of the second single-mode optical fiber and the multimode fiber, and the coupling step comprises moving at least some of the optical parts.

4. The method of claim 2, wherein the quantity representative of the optical power present in the first group of secondary modes and, where appropriate in the second group of secondary modes, corresponds to a ratio of the optical power of the second group of secondary modes and of the optical power of the fundamental mode.

5. The method of claim 1, wherein the fixing step comprises soldering the free end of the second single-mode fiber and the junction end of the multimode fiber.

6. The method of claim 1, further comprising a preliminary step of fixing an intermediate fiber having desired characteristics of the multimode fiber to the multimode measuring fiber and removing a segment of the intermediate fiber subsequent to the fixing step.

7. The method of claim 1, wherein the multimode measuring fiber has a length greater than or equal to $10^5$ times the coherence length of the source.

8. The method of claim 1, wherein the soldering comprises tapering the second single-mode fiber.

9. The method of claim 1, wherein the second single-mode fiber has a length of between 100 microns and several centimeters.

* * * * *